United States Patent
Garnier et al.

(10) Patent No.: US 11,268,400 B2
(45) Date of Patent: Mar. 8, 2022

(54) METHOD AND A SYSTEM FOR DETECTING THE ANGULAR POSITION OF BLADES OF A TURBINE ENGINE ROTOR WHEEL

(71) Applicant: SAFRAN AIRCRAFT ENGINES, Paris (FR)

(72) Inventors: Almeric Pierre Louis Garnier, Moissy Cramayel (FR); Tony Alain Roger Joel Lhommeau, Moissy Cramayel (FR); Lorris Michel Cognot, Moissy Cramayel (FR); Thierry Raymond Poix, Moissy Cramayel (FR); Alexandre Jean Joseph Salvi, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/432,968

(22) Filed: Jun. 6, 2019

(65) Prior Publication Data
US 2019/0376412 A1  Dec. 12, 2019

(30) Foreign Application Priority Data
Jun. 6, 2018 (FR) ...................................... 18 54923

(51) Int. Cl.
*F01D 21/00* (2006.01)
*G01B 7/30* (2006.01)
(Continued)

(52) U.S. Cl.
CPC ........... *F01D 21/003* (2013.01); *F01D 17/02* (2013.01); *F01D 17/04* (2013.01); *F01D 17/06* (2013.01);
(Continued)

(58) Field of Classification Search
CPC ........ F01D 21/003; F01D 17/02; F01D 17/04; F01D 17/06; F01D 21/04; F05D 2260/80;
(Continued)

(56) References Cited

U.S. PATENT DOCUMENTS

2001/0014837 A1* 8/2001 Escuret .................. F01D 17/08
                                                                  700/170
2012/0101775 A1* 4/2012 Mitchell ............... F01D 21/003
                                                                  702/183
(Continued)

FOREIGN PATENT DOCUMENTS

DE        198 18 799 A1    6/1999
DE   10 2016 219 355 A1    4/2018
(Continued)

OTHER PUBLICATIONS

French Preliminary Search Report dated Jan. 28, 2019 in French Application 18 54923, filed on Jun. 6, 2018 (with English Translation of Categories of cited documents & written opinion).

*Primary Examiner* — Courtney D Heinle
*Assistant Examiner* — Andrew J Marien
(74) *Attorney, Agent, or Firm* — Oblon, McClelland, Maier & Neustadt, L.L.P.

(57) ABSTRACT

A method of detecting the angular positions of blades of a rotor wheel of a turbine engine, in which the turbine engine has first and second rotor wheels including respective first and second numbers of blades regularly distributed around their circumferences, includes: detecting the passage of each blade of the first wheel past a first sensor; detecting the passage of each blade of the second wheel past a second sensor; calculating the time intervals between the passage of a blade of the first wheel and the passages of each of the blades of the second wheel; and determining the relative angular position of each blade of the first wheel relative to (Continued)

the angular positions of the blades of the second wheel, the first number and the second number being distinct and mutually prime.

13 Claims, 4 Drawing Sheets

(51) Int. Cl.
| | | |
|---|---|---|
| *G01B 11/26* | (2006.01) | |
| *F01D 21/04* | (2006.01) | |
| *F01D 17/04* | (2006.01) | |
| *F01D 17/02* | (2006.01) | |
| *F01D 17/06* | (2006.01) | |
| *F04D 27/00* | (2006.01) | |

(52) U.S. Cl.
CPC ........... *F01D 21/04* (2013.01); *F04D 27/001* (2013.01); *F04D 27/008* (2013.01); *G01B 7/30* (2013.01); *G01B 11/26* (2013.01); *F05D 2220/30* (2013.01); *F05D 2260/80* (2013.01); *F05D 2260/83* (2013.01)

(58) Field of Classification Search
CPC ... F05D 2260/83; F04D 27/001; F04D 27/008
USPC .............................................. 415/118; 416/61
See application file for complete search history.

(56) References Cited

U.S. PATENT DOCUMENTS

| | | | |
|---|---|---|---|
| 2012/0148400 A1* | 6/2012 | Gerez | F01D 21/045 416/1 |
| 2014/0288865 A1* | 9/2014 | Russhard | F01D 17/02 702/87 |
| 2016/0281528 A1* | 9/2016 | Penda | F01D 25/24 |
| 2017/0315021 A1 | 11/2017 | Nicq et al. | |
| 2018/0158223 A1* | 6/2018 | Kobayashi | F01D 21/003 |
| 2019/0033061 A1* | 1/2019 | Onishi | G01B 5/0014 |

FOREIGN PATENT DOCUMENTS

| | | |
|---|---|---|
| EP | 1 138 952 A1 | 10/2001 |
| EP | 2 781 897 A2 | 9/2014 |
| WO | WO 02/16881 A1 | 2/2002 |
| WO | WO 2016/062946 A1 | 4/2016 |

* cited by examiner

METHOD AND A SYSTEM FOR DETECTING THE ANGULAR POSITION OF BLADES OF A TURBINE ENGINE ROTOR WHEEL

BACKGROUND OF THE INVENTION

The invention relates to the field of monitoring an aeroengine, and more particularly to identifying blades individually in a set of blades, in particular in order to detect possible damage or unbalance on one or more blades of an aeroengine rotor wheel.

New generation aeroengine fans are fitted with blades made of composite material. Integrating such blades in a fan provides a significant improvement in the performance of the fan together with a non-negligible saving in weight.

Nevertheless, it has been found difficult to monitor the state of health of blades made of composite material.

Whereas for metal blades, simply inspecting with the naked eye serves to detect directly any damage to the blades, that type of detection is found to be limited with composite blades. For example, an impact against a composite blade can lead to delamination and to internal damage that is not observable to the naked eye and is thus more difficult to detect.

Since composite blades are products with high added value, it is very desirable to be able to plan conditional maintenance of such blades in advance so as to be able to reduce the duration and the cost of ground maintenance of the aircraft. Planning such maintenance therefore requires any potential damage to a blade to be detected and identified effectively.

One known method of detecting damage to a blade consists in using tip-timing sensors. These sensors detect and count the passing of blades relative to a time base. Tip-timing sensor measurements are then used for calculating the natural frequency of each blade, where the natural frequency gives information about the state of health of the blade.

Identifying individual blades in a set of blades is essential both for balancing the blades and also for functions of monitoring the state of health of the blades. Such an identification is performed by detecting "beep per turn" information.

A beep per turn is a reference point, e.g. such as an engine casing, that is stationary relative to an element that is rotating, e.g. a low pressure shaft or a high pressure shaft.

This position makes it possible to know the angular position of the low pressure shaft relative to the casing (in the stationary reference frame).

Aeroengine rotors need to be balanced in order to ensure that vibration limits are complied with by the engine. For this purpose, it is necessary to compensate any measured unbalance by positioning one or more weights at precise angular positions in the stationary reference frame. The beep per turn then serves to define the position for attaching such weights. The identification carried out by a person must match the identification carried out by the machine (onboard system) providing support.

Usually, a beep per turn detection method consists in using a sensor, referred to as a beep per turn sensor, that detects teeth, or blades, passing in front of it, and more particularly the passing of a particular tooth of the facing set of blades (specifically a toothed wheel). A toothed wheel, referred to as a "phonic" wheel, is characterized in that it presents a singularity, which may be the presence of excess or missing matter that is localized on the wheel. By way of example, this anomaly is detected by means such as a capacitive sensor or a Hall effect sensor. Detecting this anomaly makes it possible to know the reference angular position for the entire wheel.

The only function of the phonic wheel is to provide this angle reference and to serve as a measurement point for measuring the speed of rotation of the rotary portions to which it is attached.

The phonic wheel does not engage an air stream. It has no "aerodynamic" function and it therefore does not contribute to the propulsion from the engine.

Nevertheless, the phonic wheel has an impact both on the weight of the aircraft, particularly since it rotates, and on integration, it being understood that this specific part is added to the low pressure shaft of the engine and that it is necessary to integrate the sensor close to the phonic wheel, in particular with the difficulties associated with operational tolerances.

It would therefore be advantageous not to integrate a phonic wheel and to obtain the beep per turn information by some other method.

Document US 2012/148400 discloses detecting the beep per turn by detecting a singularity on one blade in a set of blades other than on the phonic wheel in order to be able to do without a phonic wheel.

A system is also known from Document EP 2 661 611 for replacing speed measurements performed via a phonic wheel. When the shaft is interrupted, a phonic wheel situated upstream from the break cannot represent the speed of rotation of the turbine. This information is essential for performing regulation in order to avoid the turbine rotating too fast.

In that method, in order to obtain the information, one of the blades needs to have a profile that is different in order to generate a pressure profile that is different.

Also known from Document U.S. Pat. No. 8,528,317 is a method of monitoring foreign object damage (FOD) on a turbofan making use of beep per turn information from a phonic wheel.

Another known method of identifying a beep per turn relies on the teeth of a phonic wheel presenting a distribution difference. Specifically, the proximity difference will have an influence on the times of passing as detected by the beep per turn sensor. Algorithmic processing enables this singularity in the time differences to be used to identify the singularity in the distribution of the set of blades and thus to identify an angle reference.

All of the known solutions mentioned above propose obtaining a beep per turn by making a singularity in a set of blades or on a phonic wheel.

Introducing a singular blade into a turbine engine leads to that blade behaving differently compared with the other blades of the turbine engine and also presents other drawbacks such as the need to develop a specific part and the need to make provision for managing the production of different blades. There therefore exist problems associated with certifying the turbine engine, with managing stocks, with making maintenance of the turbine engine more complicated, and also with aerodynamic and vibratory disturbances due to the singularity of the singular blade, thereby degrading performance.

The above-described known methods also have the drawback of generating a position for a blade in a manner that is not equally distributed, i.e. that is angularly not regular relative to the other blades. It is possible for the blades in the set of blades to be distributed in non-uniform manner, but that also leads to constraints in manufacture and to aerodynamic disturbances that have a negative impact on the performance of the engine.

The above-described known methods also have the drawback of the sensors requiring a bandwidth that is appropriate for detecting the passage of all of the blades, and over all of the ranges of speeds that might be adopted. Specifically, if the speed is too fast or if the number of blades is too large, then a capacitive sensor can no longer distinguish between the blades, and it becomes necessary to use an optical sensor, for example.

OBJECT AND SUMMARY OF THE INVENTION

The invention seeks to mitigate the above-mentioned drawbacks and to overcome the above-mentioned difficulties by proposing to detect the angular positions of the blades of a rotor wheel in a turbine engine without a phonic wheel.

The invention provides a method of detecting the angular positions of blades of a rotor wheel of a turbine engine, the turbine engine having at least two rotor wheels each having a stream of air passing therethrough and being coupled together directly or indirectly, the first wheel having a first number of blades and the second wheel having a second number of blades.

According to a general characteristic of the invention, the method comprises detecting the passage of each blade of the first wheel past a first sensor, detecting the passage of each blade of the second wheel past a second sensor, calculating the time intervals between the passage of a blade of the first blade and the passages of each of the blades of the second wheel, and determining the relative angular position of each blade of the first wheel relative to the angular positions of the blades of the second wheel, the first number of blades of the first wheel and the second number of blades of the second wheel being distinct and mutually prime.

The invention thus makes it possible to detect the angular positions of the blades of a rotor wheel of a turbine engine without using a phonic wheel, thereby obtaining a saving in rotating mass and bulk, and without any singularity of a blade of a wheel, thereby making it possible to avoid introducing aerodynamic disturbance into the stream passing through the turbine engine. This detection is performed by making use of time information from two sets of blades that do not have the same numbers of blades.

This detection can be performed equally well when the aircraft is on the ground and when it is in flight. Advantageously, the invention makes use of the sets of blades that are already present on the shaft of the turbine engine and that are dedicated to propulsion. Comparing the time signals from the two sets of blades thus makes it possible to obtain an angle reference of the beep per turn type. Specifically, it is thus possible to form an angle reference from the relative positioning of the blades on the two rotor wheels.

More particularly, comparing the passing times (or times of arrival) of the blades of the first rotor wheel with the times of arrival of the blades of the second rotor wheel consecutively makes it possible to identify a pattern, i.e. a signature. The signature makes it possible to identify each blade in particular and to define it as the beep per turn.

In a first aspect of the method of detecting angular position, the method may also further comprise determining the speed of rotation of the shaft or of the shafts driving the two rotor wheels, the determination of the relative angular position taking account of the determined speed(s) of rotation.

The signature varies as a function of the speeds of the shaft. Since the differences are associated with the distributions of the blades, they can be normalized by the speed of rotation for a number of blades that is known. Thus, the logic for detecting the beep per turn does not depend on the speed of rotation of the shaft in this sense.

In a second aspect of the method of detecting angular position, the sensors are synchronized on a common time base in order to improve the accuracy with which time intervals are measured for detected times of arrival of the blades.

In a third aspect of the method of detecting angular position, the method may further comprise monitoring the twisting of the shaft, with determination of the relative angular position taking account of said determined twisting.

Taking twisting of the shaft into account when determining the relative angular positions of the blades makes it possible to reduce disturbances in the time measurements in the event of the shaft being subjected to non-negligible amounts of deformation.

The invention also provides a method of detecting damage to one or more blades constituting a rotor wheel of an aeroengine, the method comprising detecting the angular positions of the blades of a wheel as defined above.

The method of detecting damage to one or more blades constituting a rotor wheel may comprise measuring the speed of the engine, and for each blade, may comprise the following steps:

acquiring measurements relating to the times of arrival of the tip of a blade in register with a reference zone of the rotor wheel;

calculating a deflection at the tip of the blade from said measurements and from the speed of the engine;

extracting a dynamic component of the calculated deflection;

determining variation in the dynamic behavior of the blade from the extracted dynamic component;

comparing the determined variation in the dynamic behavior with a first variation threshold, the first variation threshold being associated with a second variation threshold for a natural frequency of the blade relative to a damage threshold of the blade; and identifying damage to the blade when said dynamic behavior variation is greater than or equal to the first variation threshold.

The invention also provides a turbine engine comprising first and second rotor wheels, each passing a stream of air and coupled together directly or indirectly, the first wheel having a first number of blades and the second wheel having a second number of blades.

According to a general characteristic of the invention, the turbine engine further comprises a system for detecting the angular positions of the blades of the first and second rotor wheels, the system comprising at least one first sensor associated with the first rotor wheel and at least one second sensor associated with the second rotor wheel, each of said sensors being configured to generate a signal each time a blade of a rotor wheel passes in front of the sensor, and a processor unit configured to determine the time intervals between detecting a blade of the first wheel and detecting each of the blades of the second wheel, the first number of blades of the first wheel and the second number of blades of the second wheel being distinct and mutually prime.

In a first aspect of the turbine engine, the first and second wheels may be driven by the same shaft. Drive is then direct.

In a second aspect of the turbine engine, the first and second wheels may be driven by respective first and second shafts, the first and second shafts being mechanically connected together by a reduction gearing device. Both wheels are driven indirectly by the same shaft.

In a third aspect of the turbine engine, the detection system may comprise at least two sensors for each of the first and second rotor wheels, each of the two rotor wheels being associated with two different types of sensor, the type of sensor being selected in particular from the optical, magnetic, and capacitive types.

The pair of parameters comprising the numbers of blades of the disks and the speed of the shaft determine the technology that can be used for the sensors in order to ensure good resolution when acquiring the times of arrival and to distinguish between the detected blades.

In a fourth aspect of the turbine engine, the first number of blades may be not less than two and the second number of blades may be not less than three.

In a fifth aspect of the turbine engine, the turbine engine may include a clock module on which the sensors are synchronized.

In a sixth aspect of the turbine engine, the sensors preferably possess a frequency passband corresponding to the speeds of rotation of the shaft for which the blades are detected.

The invention also provides an aircraft having at least one turbine engine as defined above.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS

Figure 1:
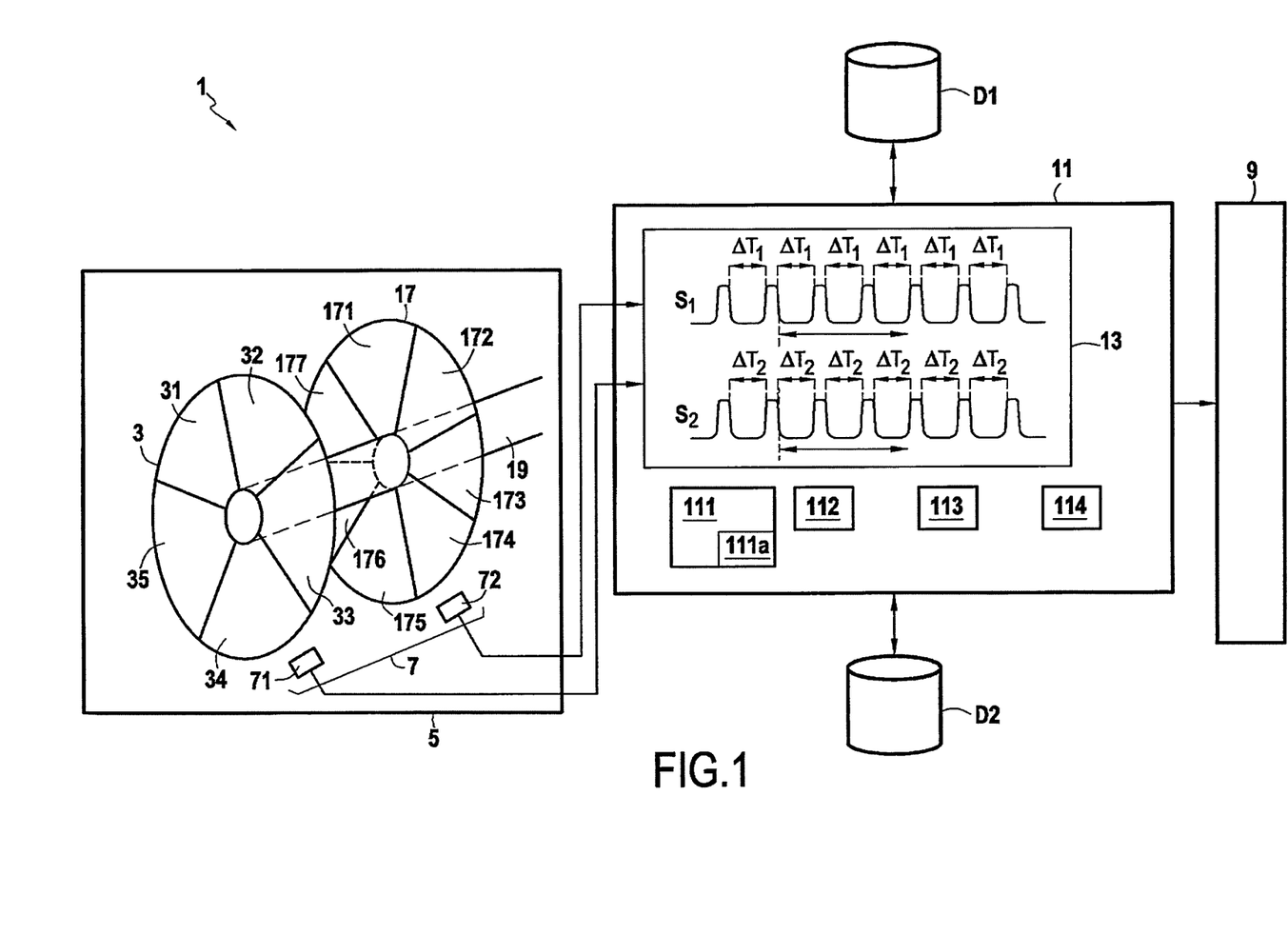
FIG. 1 is a diagram showing a damage detection system for blades of an aeroengine rotor wheel having an angular position detection system relating to the blades of two rotor wheels in a first embodiment of the invention.

FIG. 1 is a diagram showing a damage detection system for blades of a rotor wheel, or bladed wheel (or set of blades) 3 in a turbine engine 5 or aeroengine in a first embodiment of the invention.

The system 1 includes data acquisition means 7, warning means 9, and processor means 11 such as a computer including in particular calculation means. The processor means 11 are associated with storage means in the form of one or more databases D1, D2. The processor means 11 are also configured to execute a computer program comprising code instructions designed to implement an algorithm for acquiring, for signal processing, for analyzing, and for issuing a warning in accordance with the damage detection method of the invention.

The processor means 11 may be integrated in a specific unit or in an already existing electronic unit. For example, the processor means 11 may form part of a computer or more particularly, of an engine control unit (ECU) or of an engine monitoring unit (EMU).

The acquisition means 7 are configured in particular to acquire a time signal S1 relating to the blades 31 to 35 of a rotor wheel 3, e.g. the fan rotor wheel or any other rotor wheel of the engine 5.

Advantageously, the acquisition means 7 use a tip-timing technique in order to measure the times of arrival (TOA) of the blades 31.

The acquisition means 7, which are integrated in the aeroengine 5 while it is in operation, include at least one tip-timing sensor 71 installed on the casing of the engine 5 in register with the rotor wheel 3 so as to acquire a time signal S1 specific to the sensor 71.

More particularly, a tip-timing sensor 71 detects and counts the passages of the tips of the blades 31 to 35 relative to a time base. Thus, a tip-timing sensor 71 can measure the current times of arrival of the blades 31 to 35 relative to a reference point, also referred to as the "beep per turn". For a tip-timing sensor 71, the times of arrival (TOA) specific to each blade 31 to 35 can then be deduced from the data measured by the processor means 11, specifically via a calculation module 13.

In other words, a tip-timing sensor 71 serves to acquire measurements relating to the times of arrival of the tip of each blade 31 to 35 in register with a reference zone of the rotor wheel 3. Furthermore, when one or more sensors 71 are used on the same rotor wheel, in order to limit any risk of losing tip-timing sensors 71, it is possible to position the sensors 71 so as to maximize the azimuth distance between them, in order to keep them as far apart as possible from one another. Thus, in the event of a sensor 71 failing locally (e.g. debris impacting on a blade 31, or the sensor 71 becoming clogged) any risk of all of the sensors 71 being affected is minimized.

In normal operation, the blades 31 to 35 move past a given tip-timing sensor 71 in regular manner. At a given speed, and for any one sensor 71, a time interval $\Delta t$ is thus measured between the passing of two consecutive blades.

Conversely, if there is a degradation in the state of a blade, e.g. due to wear or to ingesting a foreign object (known as foreign object damage (FOD)), this can give rise to a change in the position of the blade at the moment when it moves past at least one of the sensors 71.

In order to be able to identify each of the blades 31 to 35 independently of its state, the processor means 11 are configured to analyze the various time signals S1 relative to an angle reference.

The angle reference may be provided by a "beep per turn" detection system in an embodiment of the invention. The "beep per turn" detection system of the invention is an angular position detection system relating to the blades of a first rotor wheel, such as the rotor wheel 3 for which blade damage is being monitored by the sensor 71, and to the blades of a second rotor wheel 17, with the first and second rotor wheels 3 and 17 both having the same air stream passing through them, and in the embodiment shown in FIG. 1, both being driven by the same shaft 19 of the turbine engine 5.

Damage to the blades of the second rotor wheel 17 can be monitored likewise in the same manner as for the blades of the first rotor wheel 3 by using other tip-timing sensors mounted in register with the second wheel 17.

The first wheel 3 has a first number of blades $N_1$ and the second wheel 17 has a second number of blades $N_2$, the number of blades $N_1$ of the first rotor wheel 3 and the number of blades $N_2$ of the second rotor wheel 17 being different and not presenting any common divisor. The first and second blade numbers $N_1$ and $N_2$ are thus mutually prime. The blades are regularly distributed around each of the rotor wheels 3 and 17. Thus, on a given rotor wheel 3 or 17, two adjacent blades are spaced apart by the same angular interval.

The "beep per turn" detection system comprises at least one first sensor 71 associated with the first rotor wheel 3 and at least one second sensor 72 associated with the second rotor wheel 17. In the example shown in FIG. 1, the "beep per turn" detection system comprises one first sensor 71 and one second sensor 72. The first sensor 71 associated with the first rotor wheel 3 may correspond to the sensor 71 used by the acquisition means 7 of the damage detection system 1, thereby enabling the weight, the size, and the cost of the turbine engine to be reduced.

The first and second sensors 71 and 72 are time-synchronized by a common clock and they are configured to generate a signal each time a blade of the first or second rotor wheel 3 or 17 moves past in front of the corresponding sensor 71 or 72.

The "beep per turn" detection system further comprises a processor unit configured to determine the time intervals between detecting a blade of the first rotor wheel 3 and detecting each of the blades of the second rotor wheel 17. In this embodiment, the processor unit coincides with the processor means 11 of the damage detection system 1.

The first onboard sensor 71 delivers a first time signal S1 each time a blade of the first rotor wheel 3 passes in front of it. The second onboard sensor 72 delivers a second time signal S2 each time a blade of the second rotor wheel 17 passes in front of it. The time interval between each detection, written $\Delta T1$ for the first rotor wheel 3 and $\Delta T2$ for the second rotor wheel 17, depends on the speed of rotation of the shaft 19 and on the respective numbers of blades on the rotor wheels 3 and 17.

Figure 2:
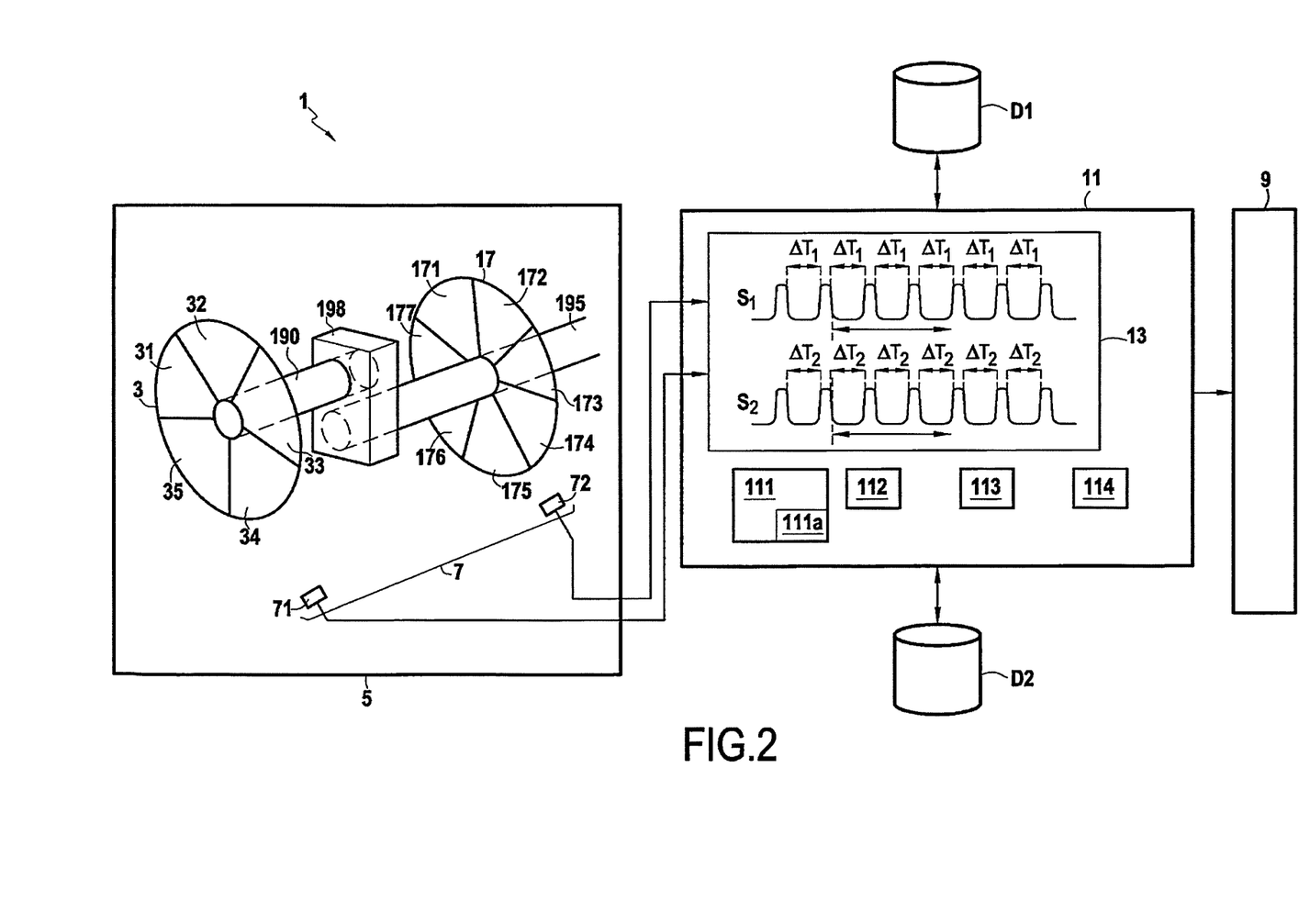
FIG. 2 is a diagram showing a damage detection system for blades of a rotor wheel of an aeroengine having an angular position detection system relating to the blades of two rotor wheels in a second embodiment of the invention.

FIG. 2 is a diagram showing a damage detection system 1 for the blades of a rotor wheel 3 of an aviation turbine engine 5 in a second embodiment of the invention.

The second embodiment shown in FIG. 2 differs from the first embodiment shown in FIG. 1 in that the first and second rotor wheels 3 and 17 both pass a stream of air that need not necessarily be the same stream, and they are driven by two distinct shafts 190 and 195 that are connected to each other by reduction gearing 198.

Figure 3:
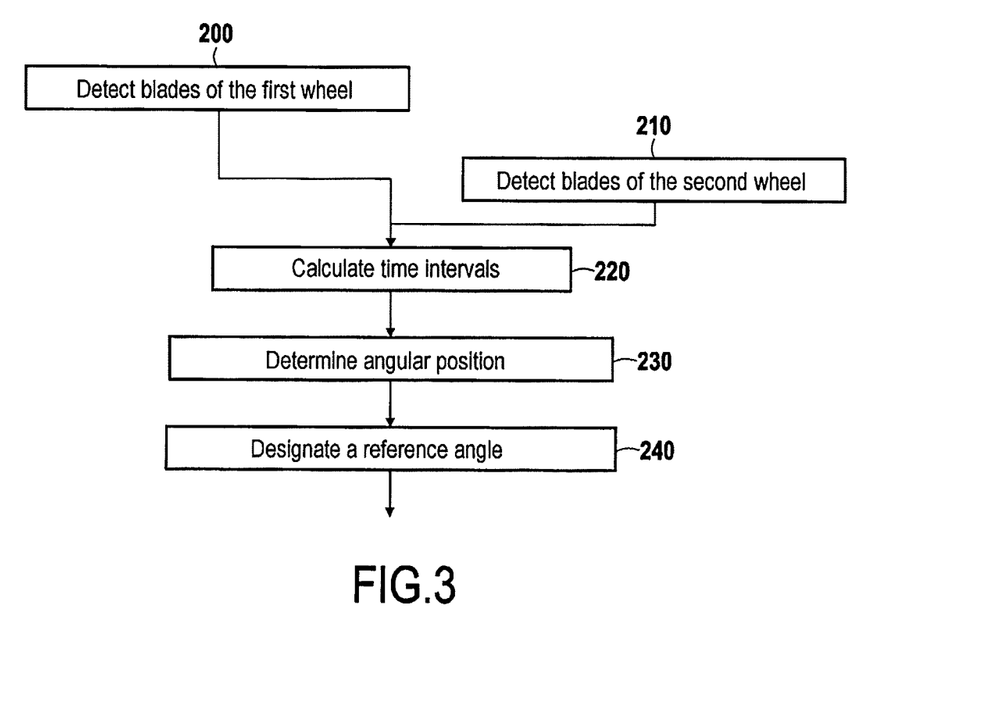
FIG. 3 is a flow chart of a method of detecting the angular position of the blades of a rotor wheel in a turbine engine.

The beep per turn detection system uses a corresponding method that is shown diagrammatically in the flow chart of FIG. 3.

The method has a first step 200 in which the first sensor 71 detects the passing of each blade 31 to 35 of the first rotor wheel 3.

Simultaneously, in a second step 210, the second sensor 72 detects the passing of each blade 171 to 177 of the second wheel 17.

In a third step 220, the processor unit 11 calculates the time intervals $\Delta t$ between the passing of any one of the blades of the first wheel 3 and each of the blades 171 to 177 of the second wheel 17.

Thereafter, in a fourth step 230, the processor unit 11 determines the relative angular position of each blade 31 to 35 of the first wheel 3 relative to the angular positions of the blades 171 to 177 of the second wheel 17.

Finally, in a fifth step 240, the processor unit 11 designates as its angle reference, i.e. as its beep per turn, the blade of the first rotor wheel 3 that presents the smallest time difference $\Delta t$ with a blade of the second rotor wheel 17.

In a variant, the calculated time interval may be normalized relative to the speed of rotation of the shaft 19 driving both rotor wheels 3 and 17 so that the calculation is independent of the speed of rotation.

In a variant, calculation of the time interval takes account of the reduction coefficient of the reduction gearing 198, if any.

A disk occupies $2\pi$ radians, so associating this with the speed of rotation of the shaft gives:

1 revolution per minute=$2\pi/60$ rad·s$^{-1}$

For a constant speed of rotation, written RPM below, the time interval between two successive blades of a given rotor wheel possessing a number N of blades passing in front of a sensor associated with that rotor wheel is given by the following equation:

$$\Delta t = \frac{60}{2\pi * \text{RPM}} * \frac{1}{N}$$

For the first rotor wheel 3 and the first sensor 71 dedicated thereto, this gives:

$$\Delta t_1 = \frac{60}{2\pi * \text{RPM}} * \frac{1}{N_1}$$

And for the second rotor wheel 17 and the second sensor 72 dedicated thereto, this gives:

$$\Delta t_2 = \frac{60}{2\pi * \text{RPM}} * \frac{1}{N_2}$$

The first and second sensors therefore do not make the same number of detections of blade passes for a given number of revolutions of the shaft.

In the embodiment shown in FIG. 1, the first rotor wheel 3 has five blades, giving $N_1=5$, and they are referenced 31 to 35, while the second rotor wheel 17 has seven blades, i.e. $N_2=7$, and they are referenced 171 to 177. In order to make calculation easier, consideration is given to the shaft rotating at a speed of $60/2\pi$ revolutions per minute, RPM=$60/2\pi$ rpm.

With these characteristics, and considering that the sensors have the same angular position in order to simply matters, the following blade times of arrival are obtained:

| First sensor 71 | Second sensor 72 |
| --- | --- |
| 0.100 | 0.050 |
| 0.300 | 0.192 |
| 0.500 | 0.335 |
| 0.700 | 0.478 |
| 0.900 | 0.621 |
| 1.100 | 0.764 |
| 1.300 | 0.907 |

It is important to observe that, initially, a blade is not necessarily facing a sensor, which would introduce a delay before the first detection.

In the first embodiment shown in FIG. 1 where both rotor wheels 3 and 17 are driven by the same shaft 19, the differences between the times of arrival of the blades 31 to 35 of the first rotor wheel 3 and the times of arrival of the blades 171 to 177 of the second rotor wheel 17 are given in the following matrix:

| Difference | 31 | 32 | 33 | 34 | 35 |
|---|---|---|---|---|---|
| 171 (rev. 1) | 0.05 | 0.25 | 0.45 | 0.65 | 0.85 |
| 172 | −0.092 | 0.107 | 0.307 | 0.507 | 0.707 |
| 173 | −0.235 | −0.035 | 0.164 | 0.364 | 0.564 |
| 174 | −0.378 | −0.178 | 0.021 | 0.221 | 0.421 |
| 175 | −0.521 | −0.321 | −0.121 | 0.078 | 0.278 |
| 176 | −0.664 | −0.464 | −0.264 | −0.064 | 0.135 |
| 177 | −0.807 | −0.607 | −0.407 | −0.207 | −0.007 |
| 171 (rev. 2) | 0.05 | 0.25 | 0.45 | 0.65 | 0.85 |

In the second embodiment shown in FIG. 2, where the two rotor wheels 3 and 17 are not situated on the same shaft but are driven by two distinct shafts 190 and 195 that are coupled together via reduction gearing 198 having a factor $C_{reduct.}$, the following applies:

For the first rotor wheel 3 and the first sensor 71 dedicated thereto:

$$\Delta t_1 = \frac{60}{2\pi * C_{reduct.} * \text{RPM}} * \frac{1}{N_1}$$

And for the second rotor wheel 17 and the second sensor 72 dedicated thereto:

$$\Delta t_2 = \frac{60}{2\pi * \text{RPM}} * \frac{1}{N_2}$$

By multiplying the arrival times of the blades 31 to 35 of the first rotor wheel 3 by $C_{reduct.}$ their differences with the arrival times of the blades 171 to 177 of the second rotor wheel 17 give the same matrix.

The matrix table provides as many angle references as might be desired. As shown in the matrix table, from one wheel to the other the blades are also not necessarily in alignment. If two rotor wheels are aligned, so that each rotor wheel has one blade in alignment with a blade of the other, there would be a cell in the table for which the difference is zero.

Such a database can then be used by an algorithm.

In the example shown in FIGS. 1 and 2 and the table above it is the last two blades 35 and 177 to be detected for the end of a revolution that present the smallest time difference Δt. However this result is random since it is associated with the offset associated with the first detection. The offset difference between the two rotor wheels 3 and 17 is itself associated with how the first and second rotor wheels 3 and 17 are mounted on the shaft 19, and with the angular positions of the first and second sensors 71 and 72. This offset thus depends on how the turbine engine 5 is produced and assembled.

With the first and second sensors 71 and 72 aligned at the same angle reference, the offset is associated solely with how the rotor wheels 3 and 17 are assembled on the shaft 19 and with their relative alignment.

This offset is characteristic of the turbine engine 5, and the resulting alignment between the blades from one rotor wheel to the other is inherent to the turbine engine 5. This alignment, presented in this example with reference to the times the blades go past a tip-timing sensor, is, so to speak, the time signature of this blade alignment.

As mentioned above, the fifth blade 35 of the first rotor wheel 3 and the seventh blade 177 of the second rotor wheel 17 are the nearest to being in alignment.

This alignment feature makes it possible to decide in arbitrary manner that the fifth blade 35 of the first rotor wheel 3 should be considered as the beep per turn, i.e. as the angle reference. Another blade of the first rotor wheel 3 could arbitrarily have been designated as the beep per turn based on an analysis of the above matrix table.

The alignment of the blades from one rotor wheel to the other remains identical since it is associated with how the rotor wheels are assembled in the engine and with the respective numbers of blades on the rotor wheels. Identifying the beep per turn requires only one revolution in order to be identified by the algorithm used.

Thus, on each flight of the aircraft including a turbine engine 5, the first revolution of the engine 5 suffices to reconstitute the beep per turn. Thereafter, each time the blade selected as the beep per turn is detected, that gives the time reference in the tip-timing sense, and the angle reference for the beep per turn.

The system 1 for detecting damage of a blade seeks to detect degradation of performance in one or more blades 31 to 35 of the kind that is associated with damage, i.e. that is durable and not merely a temporary disturbance that might be observed in the signal S1. Thus, the angle reference (beep per turn T12) described above is used only for identifying each of the blades 31 to 35 relative to the others. Detecting damage to a blade, as described below, thus does not consist in this example merely in observing or detecting variation in the interval Δt between the pulses measured between the blades 31 by each tip-timing sensor 71.

At least one tip-timing sensor 71 may be used for measuring the speed of the aircraft engine 5.

Each tip-timing sensor 71 may be of the capacitive type, of the inductive type, of the eddy current type, or indeed may be an optical probe, these various types of sensor being robust, accurate, and compact.

An implementation of a method of detecting damage to one or more blades 31 constituting the rotor wheel is described below.

Figure 4:
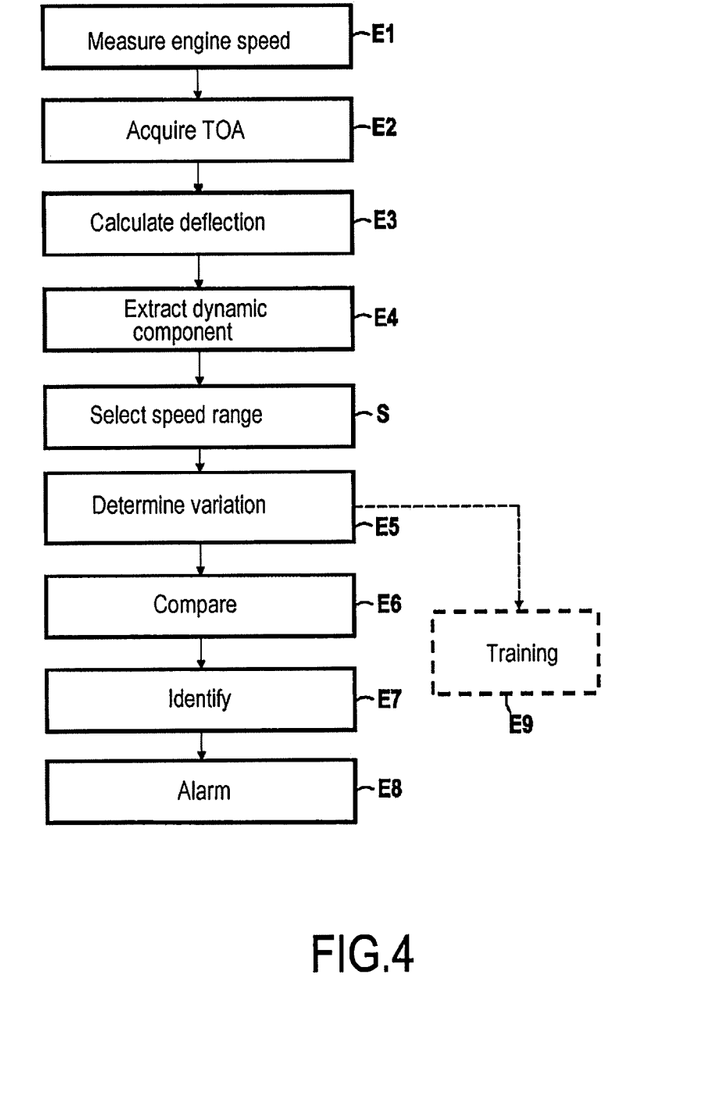
FIG. 4 is a flow chart of a method of detecting damage to one or more blades constituting a rotor wheel of an aeroengine, the method comprising detecting the angular position of the blades of a wheel in an implementation of the invention.

As shown in FIG. 4, the method comprises a step E1 of measuring the speed of the engine 5, which step is performed by the acquisition means 7. As explained above, the speed of the engine 5 may be measured by the tip-timing sensor 71.

In parallel, the tip-timing sensor 71 takes measurements relating to the times of arrival of the tips of each of the blades in register with the sensor. The processor means 11 then condition the measurements coming from the tip-timing sensor 71. This conditioning consists in identifying in real time each blade in the measured time signal with the help of an angle reference that is extracted from the temporary time of arrival (TOA) signal relating to an identified blade, and associating the identified blade with its extracted time of arrival and with information about its revolution number (step E2).

For each acquisition of a time of arrival (TOA) of a blade, the processor means 11 use the calculation module 13 to calculate a deflection at the tip of that blade (step E3), i.e. the offset in three-dimensional space of the tip of the blade 31 relative to a theoretical position for it at rest.

Thereafter, during a step E4, the processor means 11 use the extraction module 111 shown in FIG. 1 to extract the dynamic component for each calculated deflection, i.e. by isolating it from the static component. The dynamic component is extracted by isolation methods that are known in the state of the art (e.g.: averaging, or using a highpass filter to extract a high frequency component).

The processor means 11 also use a selection module 112 to perform a selection step S of selecting one or more speed ranges of the engine 5 for which all of the blades on the rotor wheel 3 are assumed to be synchronous, i.e. assumed to present the same vibratory behavior for the same speed range of the engine 5. In this example, the speed ranges of the engine 5 are pre-identified relative to a reference database, e.g. the database D1, as guaranteeing that all of the blades present the same vibratory behavior when they pass in register with the tip-timing sensor 71.

In order to identify any potential damage to one or more blades in each speed range of the engine 5 as selected during the selection step S, the processor means 11 also have a processor module 113 taking as its inputs the dynamic components selected by the selection module 112.

The processor module 113 is configured to determine (step E5) any potential variation in the dynamic behavior of each blade, by determining variation for the dynamic components of each blade, and by associating these variations with a reference database. The results of the determination step E5 are also added to the tracking database, in this example, the database D2. Thus, the determination step E5 may be seen as a step of analyzing the vibratory dynamic behavior of each blade for each speed range of the engine as selected during the selection step S.

Thereafter, via a comparator 114, the processor means 11 proceed with a comparison step E6 following the determination step E5. The comparison step E6 consists in comparing each detected variation of a dynamic component of the deflection of a blade 31, i.e. each variation in its dynamic behavior, with one or more thresholds previously stored in the reference database D1.

During this step E6, each variation of a dynamic component, and thus of the dynamic behavior, as detected for a blade 31 is compared in particular with a first variation threshold, which corresponds indirectly to the blade being in a healthy state. This first threshold is associated with a second threshold that relates to variation in the natural frequency of the blade 31, and reaching this threshold corresponds to the blade 31 being damaged.

The first and second thresholds are determined and then stored in the reference database D1 during an initial training stage E9.

Detecting variation in the dynamic component of the deflection of the blade 31, i.e. detecting variation in its dynamic behavior, is thus associated in this example with indirectly detecting a drift in the natural frequency of the blade 31, and when this drift goes beyond a predetermined threshold, that is representative of damage to the blade.

Thus, if the variation in the dynamic component of the deflection and/or of the dynamic behavior of the blade 31 is greater than the first variation threshold, that means that the natural frequency of the blade 31 itself presents drift representative of damage to the blade 31. Specifically, damage to the blade 31 leads to drift in its natural frequency and thus to drift in the dynamic component of its deflection.

Consequently, when the comparator 114 detects variation in the dynamic component of the deflection and/or in the dynamic behavior of the blade 31 that is greater than or equal to the first threshold, the blade 31 is identified (step E7) as being damaged.

An alarm indicating that the blade 31 is damaged is then issued (step E8) to the warning means 9 (e.g. using means that are audible and/or visible). Likewise, messages for sending to maintenance, or for making available to maintenance, may be triggered when issuing the alarm.

The invention claimed is:

1. A method of detecting the angular positions of blades of a rotor wheel of a turbine engine and defining a beep per turn reference for detecting damage to one or more blades constituting the rotor wheel of the turbine engine, the turbine engine having first and second rotor wheels each having a stream of air passing therethrough and being coupled together directly or indirectly, the first rotor wheel having a first number of blades regularly distributed around a circumference thereof and the second rotor wheel having a second number of blades regularly distributed around a circumference thereof, the method comprising:
   detecting a passage of each blade of the first rotor wheel past a first sensor;
   detecting a passage of each blade of the second rotor wheel past a second sensor;
   for each blade of the first rotor wheel, calculating time intervals between the passage of the each blade of the first rotor wheel and the passages of each of the blades of the second wheel;
   determining a relative angular position of each blade of the first rotor wheel relative to angular positions of the blades of the second rotor wheel based on the time intervals calculated;
   designating the blade of the first rotor wheel presenting a smallest time interval with one of the blades of the second rotor wheel as a beep per turn reference; and
   detecting damage to one or more blades constituting the rotor wheel of the turbine engine based on the beep per turn reference,
   wherein the first number of blades of the first rotor wheel and the second number of blades of the second rotor wheel are distinct and mutually prime.

2. The method according to claim 1, further comprising determining a speed of rotation of at least one shaft driving at least one of the first and second rotor wheels, the determining the relative angular position taking account of the determined speed of rotation.

3. The method according to claim 1, wherein the first and second sensors are synchronized on a common time base.

4. The method according to claim 2, further comprising monitoring twisting of the at least one shaft, with the determining the relative angular position taking account of said determined twisting.

5. A method of detecting damage to one or more blades constituting a rotor wheel of turbine engine, the method comprising detecting the angular positions of the blades of a wheel in accordance with claim 1.

6. The method according to claim 1, wherein the turbine engine is free of a phonic wheel.

7. A turbine engine comprising:
   first and second rotor wheels, each passing a stream of air and coupled together directly or indirectly, the first wheel having a first number of blades and the second wheel having a second number of blades; and
   a detection system for detecting angular positions of the blades of the first and second rotor wheels and defining a beep per turn reference, the system comprising:

a first sensor associated with the first rotor wheel and a second sensor associated with the second rotor wheel, each of said first and second sensors being configured to generate a signal each time a blade of a rotor wheel passes in front of the sensor, and a processor unit configured to for each blade of the first rotor wheel, determine time intervals between detecting a passage of the each blade of the first rotor wheel past the first sensor and detecting a passage of each of the blades of the second rotor wheel past the second sensor, determine a relative angular position of each blade of the first rotor wheel relative to angular positions of the blades of the second rotor wheel based on the time intervals determined, designate the blade of the first rotor wheel presenting a smallest time interval with one of the blades of the second rotor wheel as a beep per turn reference, and detecting damage to one or more blades constituting the rotor wheel of the turbine engine based on the beep per turn reference, wherein the first number of blades of the first wheel and the second number of blades of the second wheel are distinct and mutually prime.

8. The turbine engine according to claim 7, wherein the detection system comprises at least two sensors for each of the first and second rotor wheels, each of the two rotor wheels being associated with at least two different types of sensor, the type of sensor being selected from the optical, magnetic, and capacitive types.

9. The turbine engine according to claim 7, wherein the first number of blades is not less than two and the second number of blades is not less than three.

10. The turbine engine according to claim 7, including a clock module on which the first and second sensors are synchronized.

11. The turbine engine according to claim 7, wherein the first and second sensors possess a frequency passband corresponding to speeds of rotation for which the blades are detected.

12. An aircraft including at least one turbine engine according to claim 7.

13. The turbine engine according to claim 7, wherein the turbine engine is free of a phonic wheel.

* * * * *